United States Patent
Tang et al.

(10) Patent No.: US 11,044,714 B2
(45) Date of Patent: Jun. 22, 2021

(54) METHOD FOR TRANSMITTING DOWNLINK CONTROL INFORMATION, TERMINAL DEVICE AND NETWORK DEVICE

(71) Applicant: Guangdong OPPO Mobile Telecommunications Corp., Ltd., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 2 days.

(21) Appl. No.: 16/477,137

(22) PCT Filed: Jan. 18, 2017

(86) PCT No.: PCT/CN2017/071592
§ 371 (c)(1),
(2) Date: Jul. 10, 2019

(87) PCT Pub. No.: WO2018/132983
PCT Pub. Date: Jul. 26, 2018

(65) Prior Publication Data
US 2019/0357184 A1 Nov. 21, 2019

(51) Int. Cl.
*H04B 7/0408* (2017.01)
*H04B 7/0413* (2017.01)
(Continued)

(52) U.S. Cl.
CPC ........ *H04W 72/042* (2013.01); *H04B 7/0408* (2013.01); *H04B 7/0413* (2013.01);
(Continued)

(58) Field of Classification Search
CPC .... H04B 7/02-14; H04J 11/0069-0093; H04J 2011/0003-0096;
(Continued)

(56) References Cited

U.S. PATENT DOCUMENTS

2014/0064205 A1* 3/2014 Feng ............... H04L 5/0053
370/329
2015/0063181 A1 3/2015 Haro et al.
(Continued)

FOREIGN PATENT DOCUMENTS

CN 101404526 A 4/2009
CN 101841892 A 9/2010
(Continued)

OTHER PUBLICATIONS

English translation of China OA for CN Application 201780083726.8 mailed Jul. 6, 2020.
(Continued)

*Primary Examiner* — Timothy J Weidner

(57) ABSTRACT

A method for transmitting downlink control information, terminal device and network device are provided. The method includes: a terminal device determines a plurality of candidate resource sets for transmitting first control information; the terminal device detects the first control information sent by a network device in the plurality of candidate resource sets; the terminal device determines a target resource set in the plurality of candidate resource sets according to a detection result of the first control information; the terminal device determines a target control channel resource corresponding to the target resource set according to the target resource set and a first mapping relationship, wherein the first mapping relationship is used for indicating a corresponding relationship between the plurality of candidate resource sets and a plurality of control channel resources; and the terminal device detects second control information sent by the network device in the target control channel resource.

16 Claims, 8 Drawing Sheets

(51) Int. Cl.
*H04J 11/00* (2006.01)
*H04L 5/00* (2006.01)
*H04W 8/24* (2009.01)
*H04W 72/04* (2009.01)
*H04W 72/08* (2009.01)
*H04W 88/02* (2009.01)
*H04W 92/10* (2009.01)

(52) U.S. Cl.
CPC ....... *H04J 11/0083* (2013.01); *H04J 11/0086* (2013.01); *H04L 5/0007* (2013.01); *H04L 5/0053* (2013.01); *H04W 8/245* (2013.01); *H04W 72/046* (2013.01); *H04W 72/0406* (2013.01); *H04W 72/0446* (2013.01); *H04W 72/0453* (2013.01); *H04W 72/085* (2013.01); *H04W 88/02* (2013.01); *H04W 92/10* (2013.01)

(58) Field of Classification Search
CPC ............ H04L 5/0001–0098; H04W 8/18–245; H04W 16/28; H04W 24/02–10; H04W 36/0005–385; H04W 48/02–20; H04W 72/005–14; H04W 74/002–008; H04W 84/02; H04W 84/04–047; H04W 88/02; H04W 88/04–10; H04W 92/04; H04W 92/10
See application file for complete search history.

(56) References Cited

U.S. PATENT DOCUMENTS

| | | | |
|---|---|---|---|
| 2015/0181566 A1 | 6/2015 | Stopler | |
| 2016/0254878 A1* | 9/2016 | Wang | H04W 72/042 370/329 |
| 2016/0345303 A1 | 11/2016 | Nazar et al. | |
| 2019/0357183 A1* | 11/2019 | Takeda | H04W 72/04 370/329 |

FOREIGN PATENT DOCUMENTS

| | | |
|---|---|---|
| CN | 102710405 A | 10/2012 |
| CN | 105637959 A | 6/2016 |
| RU | 2546613 C2 | 4/2015 |
| WO | 2015062051 A1 | 5/2015 |

OTHER PUBLICATIONS

Canda OA for CA Application 3050339 mailed Aug. 18, 2020.
Singapore OA for SG Application 11201906615S mailed Aug. 20, 2020.
EP Examination for EP Application 178928941 dated Aug. 10, 2020.
3GPP TSG RAN WG1 NR Ad-Hoc Meeting; Spokane, USA, Jan. 16-20, 2016; R1-1700259.
3GPP TSG RAN WG1 Meeting #87 R1-1611207; Reno, USA, Nov. 14-18, 2016.
English Translation of Chinese Office Action for Chinese Application No. 201780083726.8 dated Mar. 12, 2020.
Russian Notice of Allowance for Russian Application No. 2019125689/07 (050332) dated Apr. 24, 2020.
3GPP TSG RAN WG1 AH_NR Meeting; R1-1700619; Spokane, USA, Jan. 16-20, 2017.
3GPP TSG RAN WQ1 NR Ad-Hoc Meeting; R1-1700257; Spokane, USA, Jan. 16-20, 2017.
3GPP TSG RAN WG1 Meeting #87; R1-1611704; Reno, USA Nov. 14-18, 2016.
3GPP TSG RAN WG1 Meeting #87; R1-1611293; Reno, USA Nov. 14-18, 2016.
European Search Report dated Nov. 25, 2019 from International Application No. PCT/CN2017/071592.
Communication pursuant to Article 94(3) EPC Examination for EP Application 17892894.1 dated Feb. 12, 2021.
India First Examination Report for in Application 201917031766 dated Jan. 5, 2021.
3GPP TSG RAN WG1 NR Ad-Hoc Meeting; Spokane, USA, Jan. 16-20, 2017; R1-1700565.

* cited by examiner

METHOD FOR TRANSMITTING DOWNLINK CONTROL INFORMATION, TERMINAL DEVICE AND NETWORK DEVICE

CROSS-REFERENCE TO RELATED APPLICATION(S)

This application is a 371 application of International Application No. PCT/CN2017/071592, filed on Jan. 18, 2017, the entire disclosure of which is hereby incorporated by reference.

TECHNICAL FIELD

Implementations of the present application relate to the field of wireless communications, and more particularly, relate to a method for transmitting downlink control information, a terminal device and a network device.

BACKGROUND

In a Long Term Evolution (LTE) system, a terminal needs to detect a Physical Control Format Indicator Channel (PCFICH) in control channel resources firstly, determines the number of Orthogonal Frequency Division multiplexing (OFDM) symbols for transmitting a Physical Downlink Control Channel (PDCCH) according to information in the PCFICH, and detects the PDCCH on control channel resources of the corresponding OFDM symbols. A search space of the PDCCH includes a common search space and a UE-specific search space. Herein, the common search space is used for transmitting some common Downlink Control Information (DCI), and the UE-specific search space is used for transmitting UE-specific DCI. The common DCI is DCI sent to all terminals in a cell through broadcast, and carries some common information for the cell, such as, paging, random access response, Broadcast Control Channel (BCCH), etc. DCI with Cyclic Redundancy Check (CRC) scrambled by a Radio Network Temporary Identity (RNTI) known to the terminals generally carries less information. The UE-specific DCI is DCI sent to a certain terminal, and is used for scheduling data transmission of the terminal or used for reporting Channel State Information (CSI), and DCI with a large size may be adopted. Since the DCI with the CRC is scrambled by UE-specific RNTI, a terminal cannot detect specific DCI of another terminal.

In a 5G system, information in a control channel may be transmitted through beamforming to improve a detection performance. A network side device may send the control channel through multiple beams, and different beams aim at different directions, thereby each of terminals located at different positions may detect the control channel from a beam with a highest receiving power (i.e., a beam aiming at the terminal itself). Information such as the PCFICH, the common DCI, and the UE-specific DCI, may be transmitted through multiple beams, and control information transmitted by different beams is generally transmitted on different control-channel resources, thus the terminal needs to perform detection on multiple control-channel resources to obtain control information. The PCFICH and the common DCI carry less information which needs fewer control-channel resources, thus complexity of blind detection of the terminal is low. However, the specific DCI carries more information which needs more control channel resources, and the complexity of the blind detection is high. If the terminal performs blind detection on multiple control channel resources, the complexity of detection of the terminal is significantly increased.

SUMMARY

Implementations of the present application provide a method for transmitting downlink control information, a terminal device and a network device, which can reduce complexity of blind detection for control information by the terminal device.

In a first aspect, a method for transmitting downlink control information is provided. The method includes: a terminal device determines multiple candidate resource sets for transmitting first control information; the terminal device detects the first control information sent by a network device in the multiple candidate resource sets; the terminal device determines a target resource set from the multiple candidate resource sets according to a detection result of the first control information; the terminal device determines a target control channel resource corresponding to the target resource set according to the target resource set and a first mapping relationship, and the first mapping relationship is used for indicating a corresponding relationship between the multiple candidate resource sets and multiple control channel resources; and the terminal device detects second control information sent by the network device in the target control channel resource.

In the first mapping relationship, the corresponding relationship between the multiple candidate resource sets and the multiple control channel resources may be determined by the network device and sent to the terminal device, or may be pre-appointed, e.g., specified in a protocol, by the terminal device and the network device.

In addition, the corresponding relationship between the multiple candidate resource sets and the multiple control channel resources may be represented by a way of, such as, a table, a formula, or a figure, etc. In the corresponding relationship, the multiple candidate resource sets and the multiple control channel resources may be one-to-one correspondence, or one candidate resource set may correspond to multiple control channel resources; or one control channel resource may correspond to multiple candidate resource sets. That is, the terminal device may determine the control channel resource corresponding to the target resource set by looking up a preset table that includes the corresponding relationship between the multiple candidate resource sets and the multiple control channel resources. The table includes information of the multiple candidate resource sets and information of the multiple control channel resources. Or, the terminal device may calculate information, such as a position and size of the control channel resource corresponding to the target resource set through a preset formula representing a position relationship, and relative parameter information of the target resource set. The present application is not limited thereto.

Optionally, in an implementation of the first aspect, a beam for transmitting the second control information on the target control channel resource is the same as a beam for sending the first control information on the target resource set.

Specifically, the network device may send the first control information through multiple beams, the first control information sent through different beams is transmitted on different candidate resource sets, and different beams aim at different directions, thereby each of terminal devices at different positions may receive the first control information at a large receiving power on a beam which aims at the terminal device itself. That is, in the multiple candidate resource sets, different candidate resource sets are used for transmitting the first control information on which beamforming is performed by using different beams. The terminal device needs to detect the first control information on each candidate resource in the multiple candidate resource sets. Herein, a format and a content of the first control information, for example, a DCI format used by the first control information, are known to the terminal device, and the terminal device needs to perform blind detection in the multiple candidate resource sets respectively.

It should be understood that in each of the candidate resource sets, the terminal device may detect the first control information transmitted in each of the candidate resource sets respectively, or may perform joint detection on the first control information in the multiple candidate resource sets.

Optionally, in an implementation of the first aspect, determining, by the terminal device, the target resource set from the multiple candidate resource sets according to the detection result of the first control information includes: the terminal device determines the target resource set from at least one resource set, in which the first control information is capable of being detected, in the multiple candidate resource sets.

Optionally, in an implementation of the first aspect, determining, by the terminal device, the target resource set from the at least one resource set, in which the first control information is capable of being detected, in the multiple candidate resource sets, includes: the terminal device determines the at least one resource set as the target resource set.

Optionally, in an implementation of the first aspect, determining, by the terminal device, the target resource set from the at least one resource set, in which the first control information is capable of being detected, in the multiple candidate resource sets, includes: the terminal device determines the target resource set from the at least one resource set according to a signal receiving quality of the first control information.

Optionally, in an implementation of the first aspect, determining, by the terminal device, the target resource set from the at least one resource set according to the signal receiving quality of the first control information includes: the terminal device determines a resource set corresponding to first control information with a highest signal receiving quality from the at least one resource set as the target resource set in; or the terminal device determines a resource set corresponding to first control information of which a signal receiving quality is larger than or equal to a preset threshold from the at least one resource set as the target resource set.

It should be understood that for the terminal device, if the signal receiving quality of the first control information transmitted on the target resource set in the multiple candidate resource sets is good, since the second control information transmitted on a target control channel resource corresponding to the target resource set also uses the beam for transmission, then the second control information received by the terminal device on the target control channel resource may also have a good signal receiving quality.

Optionally, in an implementation of the first aspect, the first control information is control information transmitted through a Physical Control Format Indicator Channel (PCFICH) or through Downlink Control Information (DCI) in a common search space.

Optionally, in an implementation of the first aspect, the first control information indicates a size of a time-domain resource for transmitting control information in a current time-domain resource unit, or the first control information indicates a size of a time-domain resource for transmitting the second control information in a current time-domain resource unit.

Optionally, in an implementation of the first aspect, the second control information is control information transmitted through Downlink Control Information (DCI) in a common search space or through DCI in a specific search space of the terminal device.

For example, the DCI in the common search space may be common DCI, or may be group DCI sent to a group of terminal devices, or may be specific DCI of the terminal device, which carries less information. If the first control information is control information transmitted through a PCFICH, then the second control information may be control information transmitted through DCI in a common search space or through DCI in a specific search space of the terminal device. If the first control information may be control information transmitted through DCI in a common search space, then the second control information may be control information transmitted through DCI in a specific search space of the terminal device.

If the first control information is carried in the common DCI, then when transmitted, the first control information with CRC is scrambled by RNTI known to multiple terminal devices. If the first control information is carried in the specific DCI of the terminal device, then when transmitted, the first control information with CRC is scrambled by specific RNTI of the terminal device, and other terminal devices cannot detect the specific DCI of the terminal device.

Optionally, in an implementation of the first aspect, the multiple candidate resource sets include at least one of: a physical resource set, a sequence resource set and a control channel resource set.

For example, the physical resource set may be a frequency-domain resource set formed by multiple Physical Resource Blocks (PRBs), and different resource sets occupy different frequency-domain resources. For another example, the first control information or a Demodulation Reference Signal (DMRS) of the first control information may be transmitted through a sequence set, and different sequence resource sets include different sequences. For yet another example, the control channel resource set may be a Control Channel Element (CCE) set, and different control channel resource sets include different CCEs.

Optionally, in an implementation of the first aspect, different candidate resource sets in the multiple candidate resource sets occupy different frequency-domain resources and/or different OFDM symbols.

In second aspect, a method for transmitting downlink control information is provided. The method includes: a network device determines multiple candidate resource sets for transmitting first control information; the network device sends the first control information to a terminal device in the multiple candidate resource sets; wherein a beam for sending the first control information on each candidate resource sets is different from beams for sending the first control information on other candidate resource sets in the multiple candidate resource sets; the network device determines multiple control channel resources corresponding to the multiple candidate resource sets; the network device sends second control information to the terminal device on the multiple control channel resources, and a beam for sending the second control information on each control channel resource is the same as a beam for transmitting the first control information on a candidate resource set corresponding to the each control channel resource.

Specifically, the network device may send the first control information through multiple beams, the first control information sent through different beams is transmitted on different candidate resource sets, and different beams aim at different directions, thereby each of terminal devices located at different positions may receive the first control information at a large receiving power on the beam aiming at the terminal device itself. That is, in the multiple candidate resource sets, different candidate resource sets are used for transmitting the first control information on which beamforming is performed by using different beams.

Optionally, in an implementation of the second aspect, the first control information is control information transmitted through a Physical Control Format Indicator Channel (PCFICH) or through Downlink Control Information (DCI) in a common search space.

Optionally, in an implementation of the second aspect, the first control information indicates a size of a time-domain resource for transmitting control information in a current time-domain resource unit, or the first control information indicates a size of a time-domain resource for transmitting the second control information in a current time-domain resource unit.

Optionally, in an implementation of the second aspect, the second control information is control information transmitted through Downlink Control Information (DCI) in a common search space or through DCI in a specific search space of the terminal device.

For example, the DCI in the common search space may be common DCI, or may be group DCI sent to a group of terminal devices, or may be specific DCI of the terminal device, which carries less information. If the first control information is control information transmitted through a PCFICH, then the second control information may be control information transmitted through DCI in a common search space or through DCI in a specific search space of the terminal device. If the first control information may be control information transmitted through DCI in a common search space, then the second control information may be control information transmitted through DCI in a specific search space of the terminal device.

Optionally, in an implementation of the second aspect, the multiple candidate resource sets include at least one of: a physical resource set, a sequence resource set and a control channel resource set.

Optionally, in an implementation of the second aspect, different candidate resource sets in the multiple candidate resource sets occupy different frequency-domain resources and/or different OFDM symbols.

It should be understood in some cases, for example, if the first control information is control information transmitted through a PCFICH, or control information transmitted through Downlink Control Information (DCI) in a common search space, such as common DCI, the second control information is specific control information of the terminal device carried in specific DCI transmitted through a specific search space of the terminal device. Thus, in the method, after the terminal device detects the first control information in the multiple candidate resource sets for transmitting the first control information, if the target resource set determined by the terminal device according to a detection result of the first control information is fed back to the network device, then the network device may learn the target resource set, used when the first control signal with a good signal receiving quality for the terminal device is transmitted, according to the feedback of the terminal device.

In a third aspect, a terminal device is provided. The terminal device may perform the operations of the terminal device in the above first aspect or any possible implementation of the first aspect. Specifically, the terminal device may include module units used for performing the operations of the terminal device in the first aspect or any possible implementation of the first aspect.

In a fourth aspect, a network device is provided. The network device may perform the operations of the network device in the above second aspect or any possible implementation of the second aspect. Specifically, the network device may include module units used for performing the operations of the network device in the second aspect or any possible implementation of the second aspect.

In a fifth aspect, a terminal device is provided. The terminal device includes: a processor, a transceiver and a storage. The processor, the transceiver and the storage communicate with each other through internal connection lines. The storage is used for storing instructions, and the processor is used for executing the instructions stored in the storage. When the processor executes the instructions stored in the storage, the execution causes the terminal device to perform the method in the first aspect or any possible implementation of the first aspect, or the execution causes the terminal device to realize the terminal device provided in the third aspect.

In a sixth aspect, a network device is provided. The network device includes: a processor, a transceiver and a storage. The processor, the transceiver and the storage communicate with each other through internal connection lines. The storage is used for storing instructions, and the processor is used for executing the instructions stored in the storage. When the processor executes the instructions stored in the storage, the execution causes the network device to perform the method in the second aspect or any possible implementation of the second aspect, or the execution causes the network device to realize the network device provided in the fourth aspect.

In a seventh aspect, a computer-readable storage medium is provided, and the computer-readable storage medium stores a program, and the program causes a network device to perform any one method for transmitting downlink control information in the above first aspect and in various implementations of the above first aspect.

In an eighth aspect, a computer-readable storage medium is provided, and the computer-readable storage medium stores a program, and the program causes a network device to perform any one method for transmitting downlink control information in the above second aspect and various implementations of the above second aspect.

In a ninth aspect, a system chip is provided. The system chip includes an input interface, an output interface, a processor and a storage. The processor is used for executing instructions stored in the storage, and when the instructions are executed, the processor may perform any one method in the above first aspect and various implementations of the above first aspect.

In a tenth aspect, a system chip is provided. The system chip includes an input interface, an output interface, a processor and a storage. The processor is used for executing instructions stored in the storage, and when the instructions are executed, the processor may perform any one method in the above second aspect and various implementations of the above second aspect.

DETAILED DESCRIPTION

Hereinafter, technical solutions in implementations of the present application will be described with reference to the accompanying drawings.

It should be understood that the technical solutions of the implementations of the present application may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD), a Universal Mobile Telecommunication System (UMTS), and a future 5G communication system.

Various implementations are described herein in connection with a terminal device. The terminal device may also be referred to a user equipment (UE), an access terminal, a subscriber unit, a subscriber station, a mobile station, a mobile platform, a remote station, a remote terminal, a mobile device, a user terminal, a terminal, a wireless communication device, a user agent, or a user device. An access terminal may be a cellular phone, a cordless phone, a Session Initiation Protocol (SIP) phone, a Wireless Local Loop station, a Personal Digital Assistant (PDA), a handheld device with wireless communication function, a computing device or other processing device connected to a wireless modem, a vehicle-mounted device, a wearable device, a terminal device in a future 5G network, or a terminal device in a future evolved PLMN network, etc.

Various implementations are described herein in connection with a network device. The network device may be a device for communicating with a terminal device, such as a base station (Base Transceiver Station, referred to as "BTS") in a GSM system or CDMA system, a base station (NodeB, referred to as "NB") in a WCDMA system, or an evolved base station (Evolutional Node B, referred to as "eNB" or "eNodeB") in an LTE system, or the network device may be a relay station, an access point, a vehicle-mounted device, a wearable device, a network side device in a future 5G network, or a network side device in a future evolved PLMN network.

Figure 1:
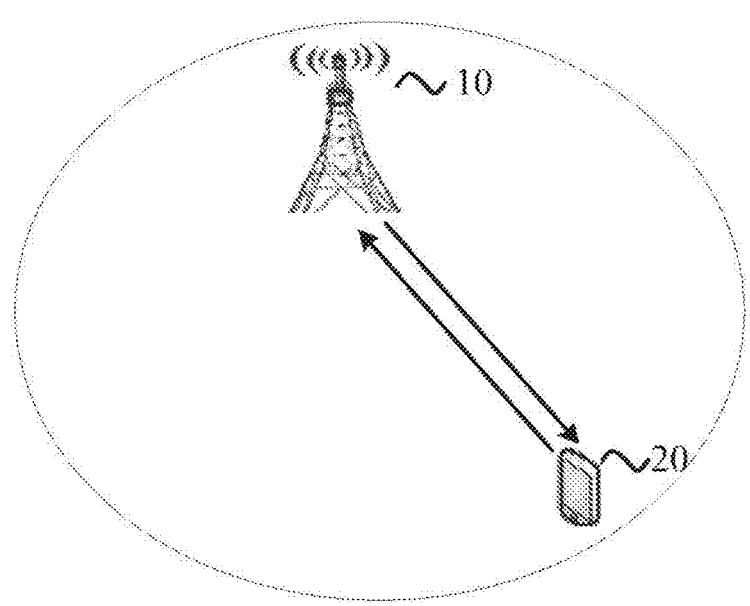
FIG. 1 is a schematic diagram of architecture of an application scenario according to an implementation of the present application.

FIG. 1 is a schematic diagram of an application scene according to an implementation of the present application. The communication system in FIG. 1 may include a network device 10 and a terminal device 20. The network device 10 is configured to provide communication services for the terminal device 20 and access to a core network. The terminal device 20 may access the network by searching for a synchronization signal, or a broadcast signal, etc., transmitted by the network device 10, to communicate with the network. Arrows shown in FIG. 1 may represent uplink/downlink transmission through cellular links between the terminal device 20 and the network device 10.

The network in the implementations of the present application may refer to a Public Land Mobile Network (PLMN), or a Device to Device (D2D) network, or a Machine to Machine/Man (M2M) network, or other networks. FIG. 1 is just a simplified diagram of an example, and the network may further include other terminal devices which are not illustrated in FIG. 1.

Figure 2:
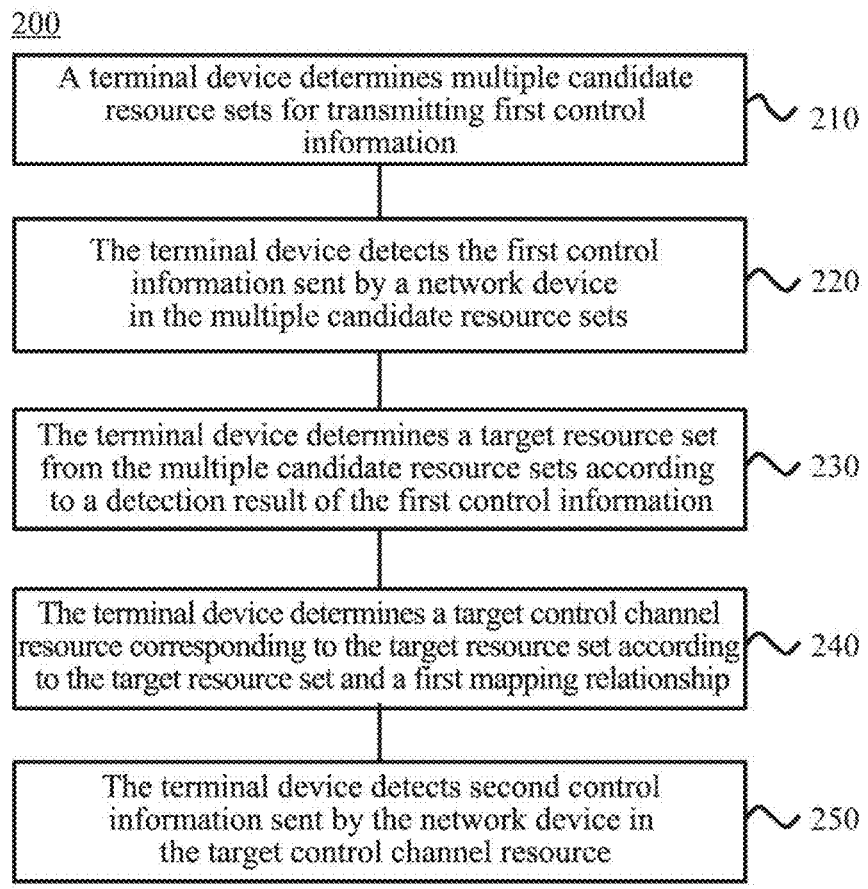
FIG. 2 is a schematic flowchart of a method for transmitting downlink control information according to an implementation of the present application.

FIG. 2 is a schematic flowchart of a method 200 for transmitting downlink control information according to an implementation of the present application. The method 200 may be implemented by a terminal device. As shown in FIG. 2, a specific flow for transmitting data includes acts 210-240.

In 210, a terminal device determines multiple candidate resource sets for transmitting first control information.

Herein, optionally, the multiple candidate resource sets include at least of: a physical resource set, a sequence resource set and a control channel resource set.

That is, the terminal device may determine multiple candidate physical resource sets for transmitting the first control information, or multiple candidate sequence resource sets for transmitting the first control information, or multiple candidate control channel resource sets for transmitting the first control information.

For example, the physical resource set may be a frequency-domain resource set formed by multiple Physical Resource Blocks (PRBs), and different resource sets occupy different frequency-domain resources. For another example, the first control information or a Demodulation Reference Signal (DMRS) of the first control information may be transmitted through a sequence set, and different sequence resource sets include different sequences. For yet another example, the control channel resource set may be a Control Channel Element (CCE) set, and different control channel resource sets include different CCEs.

Optionally, the multiple candidate sets may occupy multiple frequency-domain resources and/or multiple OFDM symbols.

For example, the multiple candidate resource sets may be multiple resource sets which are located at the same symbols but occupy different frequency bands, or the multiple candidate resource sets may be multiple resource sets which occupy a same frequency band but are located at different symbols, or the time-frequency resources occupied by the multiple candidate resource sets are different from each other.

Optionally, the first control information may be control information transmitted through a Physical Control Format Indicator Channel (PCFICH) or through Downlink Control Information (DCI) in a common search space.

Optionally, the second control information may be control information transmitted through Downlink Control Information (DCI) in a common search space or through DCI in a specific search space of the terminal device.

For example, the DCI in the common search space may be common DCI, or may be group DCI sent to a group of terminal devices, or may be specific DCI of the terminal device, which carries less information. If the first control information is control information transmitted through a PCFICH, then the second control information may be control information transmitted through DCI in a common search space or through DCI in a specific search space of the terminal device. If the first control information is control information transmitted through DCI in a common search space, then the second control information may be control information transmitted through DCI in a specific search space of the terminal device.

If the first control information is carried in the common DCI, then when transmitted, the first control information with CRC is scrambled by RNTI known to multiple terminal devices. If the first control information is carried in the specific DCI of the terminal device, then when transmitted, the first control information with CRC is scrambled by specific RNTI of the terminal device, and other terminal devices cannot detect the specific DCI of the terminal device.

Optionally, the first control information indicates a size of a time-domain resource for transmitting control information in a current time-domain resource unit, or the first control information indicates a size of a time-domain resource for transmitting the second control information in a current time-domain resource unit.

For example, the first control information may be used for indicating a size of a time-domain resource, such as the number N of the OFDM symbols, for transmitting control information in the current time-domain resource unit, such as, in a subframe or a time slot. Since sending of the control information is usually before sending of data, the terminal device may determine to detect the control information on the target control channel resource, for example, the first N symbols in one time slot, according to the number N of the OFDM symbols indicated in the first control information. The control information may include the first control information, the second control information and other control information. Or, the first control information may be used for indicating a size of a time-domain resource for transmitting the second control information in a current time-domain resource unit, such as, in a subframe or a time slot.

In 220, the terminal device detects the first control information sent by a network device in the multiple candidate resource sets.

Specifically, the network device may send the first control information through multiple beams, the first control information sent through different beams is transmitted on different candidate resource sets, and different beams aim at different directions, thereby each of terminal devices at different positions may receive the first control information at a large receiving power on the beam aiming at the terminal device itself. That is, in the multiple candidate resource sets, different candidate resource sets are used for transmitting the first control information on which beamforming is performed by using different beams. The terminal device needs to detect the first control information on each candidate resource in the multiple candidate resource sets. Herein, a format and a content of the first control information, for example, a DCI format used by the first control information, are known by the terminal device, and the terminal device needs to perform blind detection on the multiple candidate resource sets respectively.

It should be understood that in each candidate resource set the terminal device may detect the first control information transmitted in each candidate resource set respectively, or may detect the first control information jointly in the multiple candidate resource sets.

In 230, the terminal device determines a target resource set in the multiple candidate resource sets according to a detection result of the first control information.

After the terminal device detects the first control information in the multiple candidate resource sets respectively, the terminal device may determine the target resource set in the multiple candidate resource sets according to the detection result of the first control information in the multiple candidate resource sets. Optionally, the terminal device determines the target resource set in at least one resource set, in which the first control information is capable of being detected in the multiple candidate resource sets.

For example, the terminal device randomly selects one or more resource sets from the at least one resource set in which the first control information is capable of being detected as the target resource set. Or, the terminal device may determine the target resource set in following modes.

Mode 1

Optionally, determining, by the terminal device, the target resource set from the at least one resource set, in which the first control information is capable of being detected, in the multiple candidate resource sets, includes: the terminal device determines the at least one resource set as the target resource set. That is, the terminal device may determine all resource sets in the at least one resource set as the target resource sets.

Furthermore, if the terminal device detects the first control information in each of the multiple candidate resource sets, then the terminal device may determine all of the multiple candidate resource sets in which the first control information is detected as the target resource sets. Or, the terminal device may determine the target resource set from the at least one candidate resource set, in which the first control information is detected, according to a signal receiving quality of the first control information, i.e., Mode 2.

Mode 2

Optionally, determining, by the terminal device, the target resource set from the at least one resource set, in which the first control information is capable of being detected, in the multiple candidate resource sets, includes: the terminal device determines the target resource set from the at least one resource set according to the signal receiving quality of the first control information.

For example, the terminal device may determine a resource set corresponding to the first control information with a highest signal receiving quality from the at least one resource set as the target resource set; or the terminal device may determine a resource set corresponding to the first control information of which a signal receiving quality is larger than or equal to a preset threshold from in the at least one resource set as the target resource set.

In the implementation, in the multiple candidate resource sets, if the signal receiving quality of the first control information transmitted on the target resource set is good, since the second control information transmitted on target control channel resource corresponding to the target resource set also uses the beam for transmission, then the second control information received by the terminal device on the target control channel resource may also have a good signal receiving quality. The terminal device only needs to detect the second control information on the target control channel resource, thereby reducing the complexity of the blind detection of the terminal device.

In 240, the terminal device determines a target control channel resource corresponding to the target resource set according to the target resource set and a first mapping relationship.

Herein, the first mapping relationship is used for indicating a corresponding relationship between the multiple candidate resource sets and multiple control channel resources.

In the first mapping relationship, the corresponding relationship between the multiple candidate resource sets and the multiple control channel resources may be determined by a network device and sent to the terminal device, or may be pre-appointed, e.g., specified in a protocol, by the terminal device and the network device.

In addition, the corresponding relationship between the multiple candidate resource sets and the multiple control channel resources may be represented by a way of, such as, a table, a formula, or a figure, and in the corresponding relationship, the multiple candidate resource sets and the multiple control channel resources may be in a one-to-one correspondence, or one candidate resource set may correspond to multiple control channel resources; or one control channel resource may correspond to multiple candidate resource sets. That is, the terminal device may determine the control channel resource corresponding to the target resource set by looking up a preset table including the corresponding relationship between the multiple candidate resource sets and the multiple control channel resources. The table includes information of the multiple candidate resource sets and information of the multiple control channel resources. Or, the terminal device may calculate information, such as a position and size of the control channel resource corresponding to the target resource set through a preset formula, representing a position relationship, and relative parameter information of the target resource set. The present application is not limited thereto.

Figure 3A:
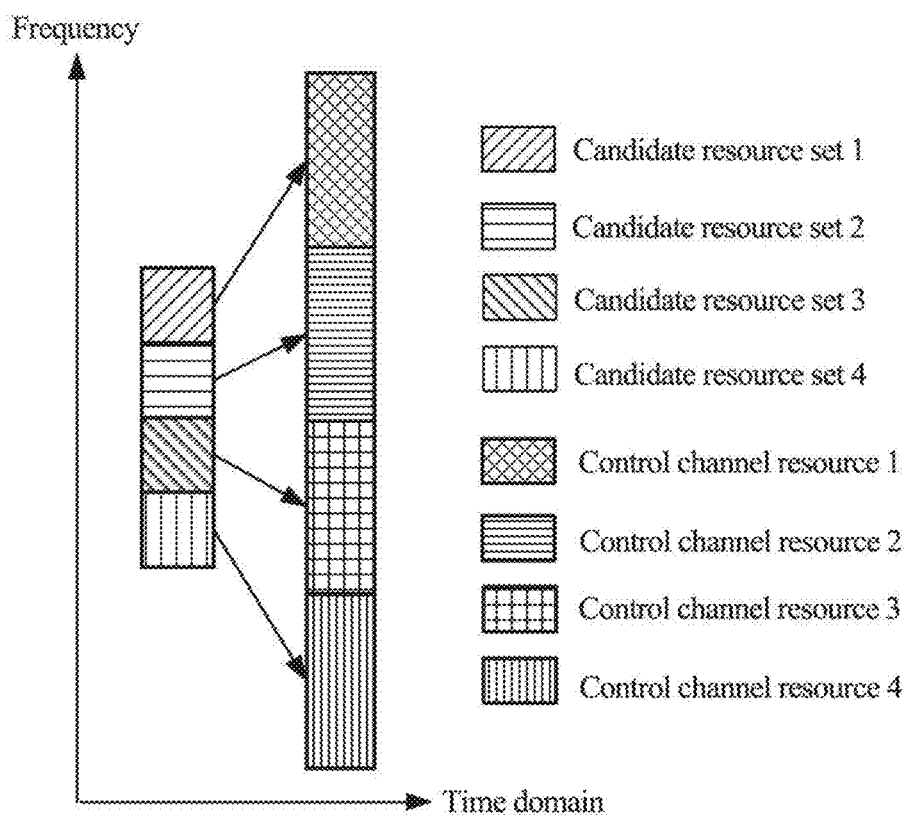
FIG. 3A is a schematic diagram of a first mapping relationship according to an implementation of the present application.

For example, a corresponding relationship between multiple candidate resource sets and multiple control channel resources is shown in the FIG. 3A. Multiple candidate resource sets are located at same symbols in a current time-domain resource unit, such as in a subframe or a time slot, but occupy different frequency-domain resources. Each candidate resource set corresponds to one control channel resource, and different control channel resources are located at the same symbols but occupy different frequency-domain resources. FIG. 3A illustrates four candidate resource sets corresponding to four different control channel resources in a one-to-one correspondence. A beam used by control information transmitted on the candidate resource set is the same as that used by control information transmitted on the corresponding control channel resource.

Figure 3B:
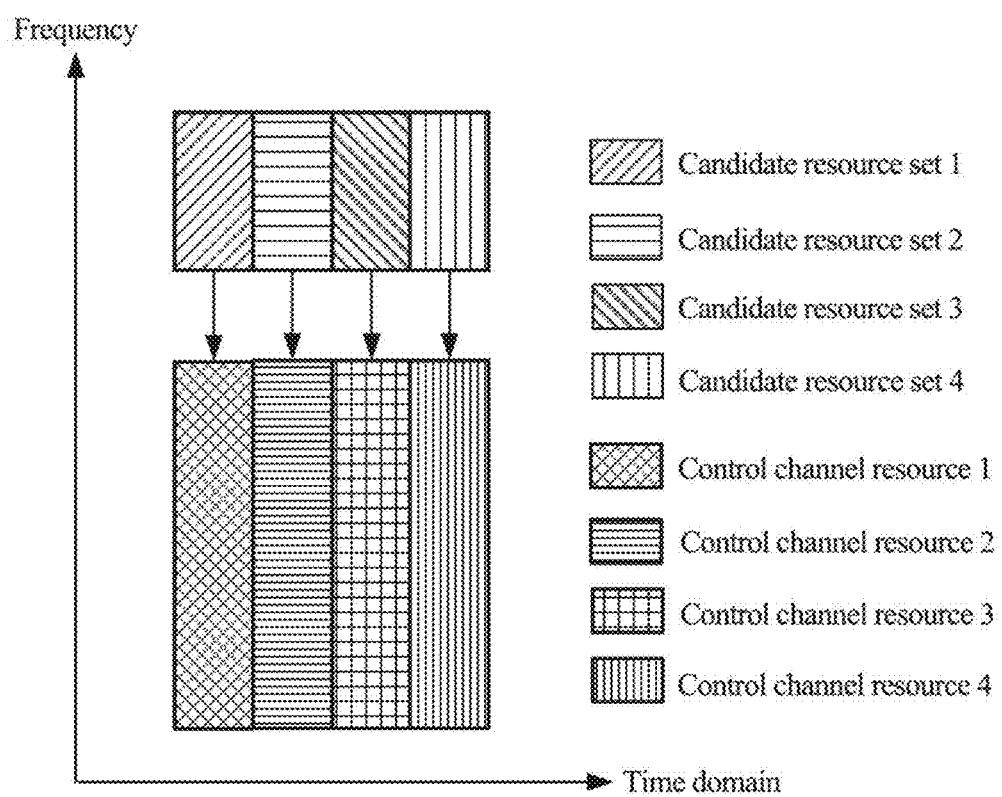
FIG. 3B is a schematic diagram of a first mapping relationship according to an implementation of the present application.

For another example, a corresponding relationship between multiple candidate resource sets and multiple control channel resources is shown in FIG. 3B. Multiple candidate resource sets occupy same frequency-domain resources but are located at different symbols in a current time-domain resource unit, such as a subframe or a time slot. Each candidate resource set corresponds to one control channel resource, and different control channel resources occupy same frequency-domain resources but are located at different symbols. FIG. 3B illustrates four candidate resource sets corresponding to four different control channel resources in a one-to-one correspondence. A beam used by control information transmitted on the candidate resource set is the same as that used by control information transmitted on the corresponding control channel resource.

Figure 3C:
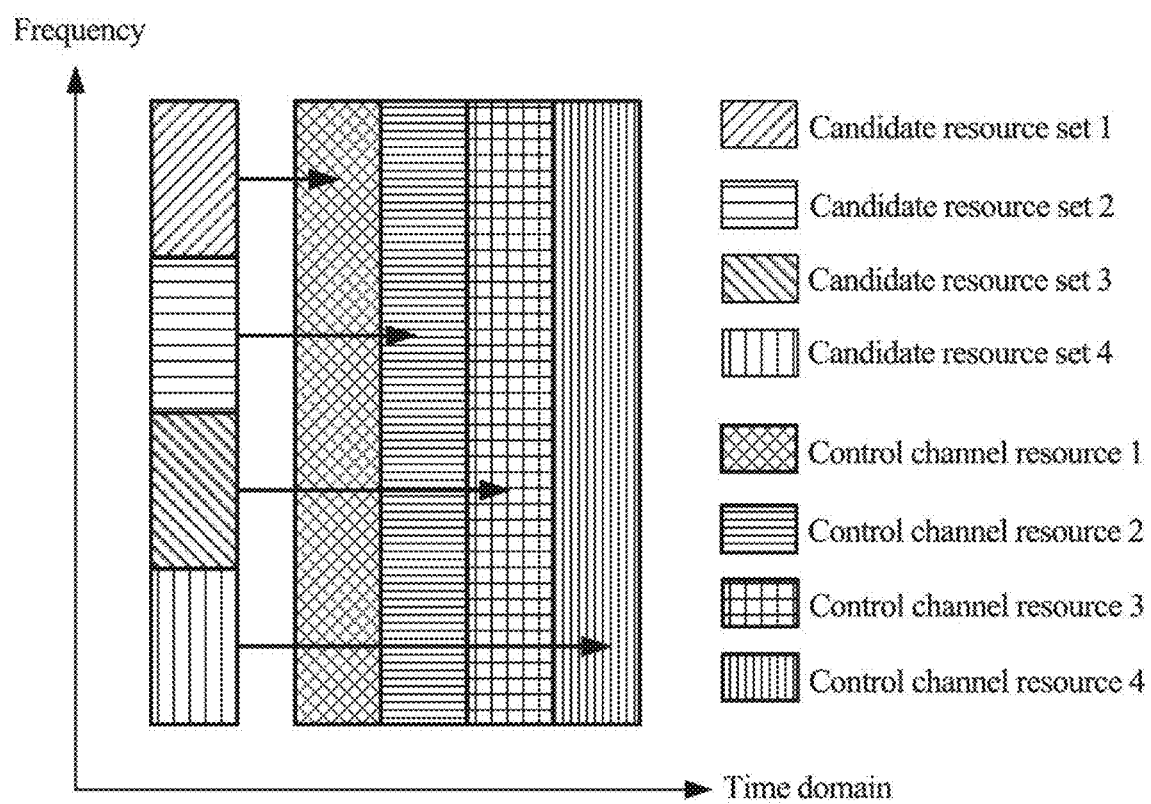
FIG. 3C is a schematic diagram of a first mapping relationship according to an implementation of the present application.

For yet another example, a corresponding relationship between multiple candidate resource sets and multiple control channel resources is shown in FIG. 3C. Multiple candidate resource sets are located at same symbols, but occupy different frequency-domain resources. Each candidate resource set corresponds to one control channel resource, and different control channel resources are located at different symbols but occupy the same frequency-domain resources. FIG. 3C illustrates four candidate resource sets corresponding to four different control channel resources in a one-to-one correspondence. A beam used by control information transmitted on the candidate resource set is the same as that used by control information transmitted on the corresponding control channel resource.

In FIG. 3A to FIG. 3B, a beam used by the first control information transmitted on candidate resource set 1 is the same as that used by the second control information transmitted on control channel resource 1, e.g., beam 1; a beam used by the first control information transmitted on candidate resource set 2 is the same as that used by the second control information transmitted on control channel resource 2, e.g., beam 2; a beam used by the first control information transmitted on candidate resource set 3 is the same as that used by the second control information transmitted on control channel resource 3, e.g., beam 3; and a beam used by the first control information transmitted on candidate resource set 4 is the same as that used by the second control information transmitted on control channel resource 4, e.g., beam 4. The beam 1, the beam 2, the beam 3 and the beam 4 are four different beams used by the network device to transmit control information.

In 250, the terminal device detects second control information sent by the network device in the target control channel resource.

Specifically, after the terminal device obtains the first control information from the target resource set, the terminal device detects the second control information sent by the network device in the target control channel resource corresponding to the target resource set. A beam used for transmitting the second control information on the target control channel resource is the same as that for sending the first control information on the target resource set.

For example, if the first control information is control information transmitted through a PCFICH, then the second control information may be common control information carried in common DCI transmitted through a common search space, or specific control information of the terminal device carried in specific DCI transmitted through a specific search space of the terminal device. If the first control information is common control information carried in common DCI transmitted through a common search space, then the second control information may be specific control information of the terminal device carried in specific DCI transmitted through a specific search space of the terminal device.

During specific implementations, for the first control information transmitted in the target resource set and the second control information transmitted in the target control channel resource corresponding to the target resource set, the network device may use a same beam to perform beamforming on the first control information and the second control information. The same beam is used for transmitting the first control information transmitted in the target resource set and the second control information transmitted in the target control channel resource corresponding to the target resource set. For the terminal device, a signal receiving quality of the first control information transmitted on the target resource set in the multiple candidate resource sets is the best, since the second control information transmitted on a target control channel resource corresponding to the target resource set also uses the beam for transmission, then the second control information received by the terminal device on the target control channel resource also have a good signal receiving quality. The terminal device only needs to detect the second control information on the target control channel resource.

In the implementations of the present application, when the terminal device receives two pieces of control information sent by the network device through the same beam, the terminal device receives the second control information on the control channel resource corresponding to a resource set for receiving the first control information, such that the terminal device has no need to perform a large amount of blind detection on the multiple control channel resources when receiving the second control information, thereby reducing the complexity of the blind detection for the second control information by the terminal device.

Figure 4:
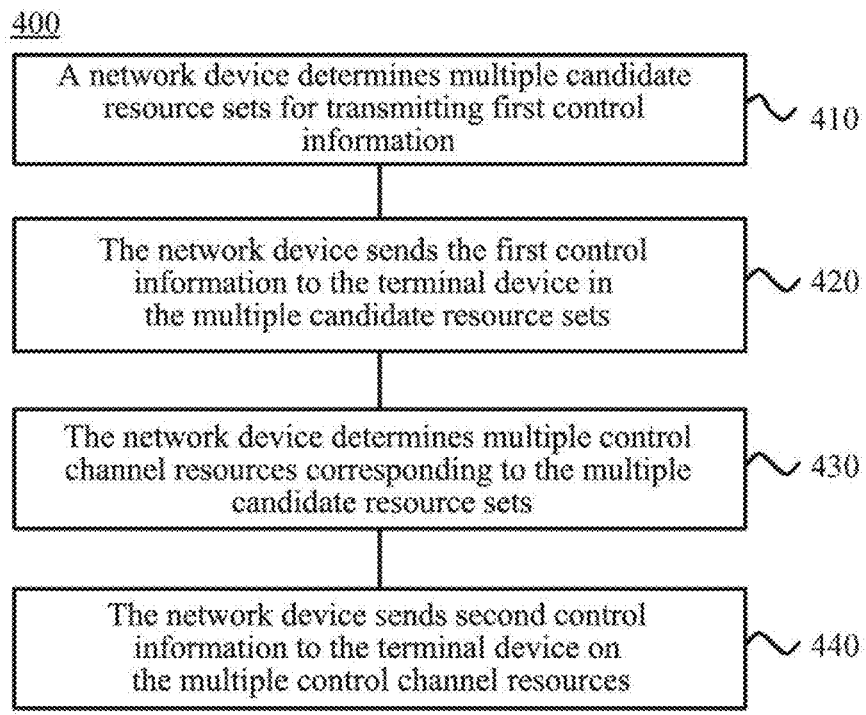
FIG. 4 is a schematic flowchart of a method for transmitting downlink control information according to an implementation of the present application.

FIG. 4 is a schematic flowchart of a method 400 for transmitting downlink control information according to an implementation of the present application. The method 400 may be implemented by a network device. As shown in FIG. 4, a specific flow for transmitting downlink control information includes acts 410-440.

In 410, a network device determines multiple candidate resource sets for transmitting first control information.

Herein, optionally, the multiple candidate resource sets include at least of: a physical resource set, a sequence resource set and a control channel resource set.

That is, the terminal device may determine multiple candidate physical resource sets for transmitting the first control information, or multiple candidate sequence resource sets for transmitting the first control information, or multiple control channel resource sets for transmitting the first control information.

For example, the physical resource set may be a frequency-domain resource set formed by multiple Physical Resource Blocks (PRBs), and different resource sets occupy different frequency-domain resources. For another example, the first control information or a Demodulation Reference Signal (DMRS) of the first control information may be transmitted through a sequence set, and different sequence resource sets include different sequences. For yet another example, the control channel resource set may be a Control Channel Element (CCE) set, and different control channel resource sets include different CCEs.

Optionally, the multiple candidate sets may occupy multiple frequency-domain resources and/or multiple OFDM symbols.

For example, the multiple candidate resource sets may be multiple resource sets which are located at same symbols but occupy different frequency bands, or the multiple candidate resource sets may be multiple resource sets which occupy different frequency bands but are located at same symbols, or time-frequency resources occupied by the multiple candidate resource sets are different from each other.

Optionally, the first control information may be control information transmitted through a Physical Control Format Indicator Channel (PCFICH) or through Downlink Control Information (DCI) in a common search space.

Optionally, the second control information may be control information transmitted through Downlink Control Information (DCI) in a common search space or through DCI in a specific search space of the terminal device.

For example, the DCI in the common search space may be common DCI, or may be group DCI sent to a group of terminal devices, or may be specific DCI of the terminal device, which carries less information. If the first control information is control information transmitted by the network device through a PCFICH, then the second control information may be control information transmitted by the network device through DCI in a common search space or through DCI in a specific search space of the terminal device. If the first control information may be control information transmitted by the network device through DCI in a common search space, then the second control information may be control information transmitted by the network device through DCI in a specific search space of the terminal device.

If the first control information is carried in the common DCI, then when transmitted, the first control information with CRC may be scrambled by RNTI known to multiple terminal devices. If the first control information is carried in a specific DCI of the terminal device, then when transmitted, the first control information with CRC is scrambled by specific RNTI of the terminal device, and other terminal devices cannot detect the specific DCI of the terminal device.

Optionally, the first control information indicates a size of a time-domain resource for transmitting control information in a current time-domain resource unit, or the first control information indicates a size of a time-domain resource for transmitting the second control information in a current time-domain resource unit.

For example, the first control information may be used for indicating a size of a time-domain resource, such as the number N of the OFDM symbols, for transmitting control information in a current time-domain resource unit, such as, in a subframe or a time slot. Since sending of the control information is usually before sending of data, the terminal device may determine to detect the control information on the target control channel resource, for example, the first N symbols in one time slot, according to the number N of the OFDM symbols indicated in the first control information. The control information may include the first control information, the second control information and other control information. Or, the first control information may be used for indicating a size of a time-domain resource used for transmitting the second control information in a current time-domain resource unit, such as, in a subframe or a time slot.

In 420, the network device sends the first control information to the terminal device in the multiple candidate resource sets.

Herein, a beam used for sending the first control information on each candidate resource set is different from beams for sending the first control information on other candidate resource sets in the multiple candidate resource sets.

Specifically, the network device may send the first control information through multiple beams, the first control information sent through different beams is transmitted on different candidate resource sets, and different beams aim at different directions, thereby each of terminal devices at different positions may receive the first control information at a large receiving power on the beam aiming at the terminal device itself. That is, in the multiple candidate resource sets, different candidate resource sets are used for transmitting the first control information on which beamforming is performed by using different beams.

In 430, the network device determines multiple control channel resources corresponding to the multiple candidate resource sets.

Specifically, the multiple candidate resource sets and the multiple control channel resources meet a first mapping relationship. In the first mapping relationship, the corresponding relationship between the multiple candidate resource sets and the multiple control channel resources may be determined by a network device and sent to the terminal device, or may be pre-appointed, e.g., specified in a protocol, by the terminal device and the network device.

The first mapping relationship, for example, may be as shown in FIG. 3A, FIG. 3B and FIG. 3C, and specifically may refer to the description in the above act 240. For the sake of brevity, that will not be repeated here.

In 440, the network device sends the second control information to the terminal device on the multiple control channel resources.

Herein, a beam for sending the second control information on each control channel resource is the same as that for transmitting the first control information on a candidate resource set corresponding to the each control channel resource.

Specifically, when the network device sends the second control information to the terminal device on the multiple control channel resources, a beam used by the second control information sent on each control channel resource is the same as that used by the first control information transmitted on the candidate resource set corresponding to the control channel resource. For the terminal device, in the multiple candidate resource sets, if a signal receiving quality of the first control information transmitted on the target resource set is the best, since the beam is also used for transmitting the second control information transmitted on target control channel resource corresponding to the target resource set, then the second control information received by the terminal device on the target control channel resource has a good signal receiving quality. The terminal device only needs to detect the second control information on the target control channel resource, thus avoiding the large amount of the blind detection on the multiple control channel resources.

For example, if the first control information is control information transmitted through a PCFICH, then the second control information may be common control information carried in common DCI transmitted through a common search space, or specific control information of the terminal device carried in a specific DCI transmitted through a specific search space of the terminal device, and the first control information may carry information of a size of a time-domain resource used for transmitting the second control information. If the first control information is common control information carried in common DCI transmitted through a common search space, then the second control information may be specific control information of the terminal device carried in specific DCI transmitted through the specific search space of the terminal device.

It should be understood in some cases, for example, if the first control information is control information transmitted through a PCFICH, or control information transmitted through Downlink Control Information (DCI), such as common DCI, in a common search space, the second control information is specific control information of the terminal device carried in specific DCI transmitted through a specific search space of the terminal device. Thus, in the method, after the terminal device detects the first control information in the multiple candidate resource sets for transmitting the first control information, if the target resource set determined by the terminal device according to a detection result of the first control information is fed back to the network device, then the network device may learn the target resource set, used when the first control signal with a good signal receiving quality for the terminal device is transmitted, according to the feedback of the terminal device. Therefore, the network device sends the second control information to the terminal device only using the same beam on the control channel resource corresponding to the target resource set, which can reduce the system overhead.

In the implementations of the present application, the network device uses a same beam to send the first control information and the second control information to the terminal device respectively on the corresponding candidate resource set and control channel resource. Therefore, when the terminal device receives two pieces of control information sent by the network device through the same beam, the terminal device can receive the second control information on the control channel resource corresponding to a resource set for receiving the first control information, such that the terminal device has no need to perform a large amount of blind detection on the multiple control channel resources when receiving the second control information, thereby reducing the complexity of the blind detection for the second control information.

Figure 5:
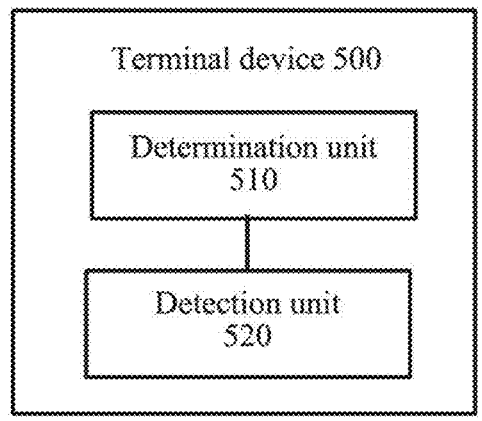
FIG. 5 is a schematic block diagram of a terminal device according to an implementation of the present application.

FIG. 5 is a schematic block diagram of a terminal device 500 according to an implementation of the present application. As shown in FIG. 5, the terminal device 500 includes a determination unit 510 and a detection unit 520. The determination unit 510 is used for determining multiple candidate resource sets for transmitting first control information.

The detection unit 520 is used for detecting the first control information sent by a network device in the multiple candidate resource sets.

The determination unit 510 is further used for determining a target resource set in the multiple candidate resource sets according to a detection result of the first control information.

The determination unit 510 is further used for determining a target control channel resource corresponding to the target resource set according to the target resource set and a first mapping relationship. The first mapping relationship is used for indicating a corresponding relationship between the multiple candidate resource sets and multiple control channel resources.

The detection unit 520 is further used for detecting second control information sent by the network device in the target control channel resource.

Therefore, when the terminal device receives two pieces of control information sent by the network device through the same beam, the terminal device receives the second control information on the control channel resource corresponding to a resource set for receiving the first control information, such that the terminal device has no need to perform a large amount of blind detection on the multiple control channel resources when receiving the second control information, thereby reducing the complexity of the blind detection for the second control information by the terminal device.

Optionally, a beam for transmitting the second control information on the target control channel resource is the same as a beam for sending the first control information on the target resource set.

Optionally, the determination unit 510 is specifically used for determining the target resource set in resource sets, in which the first control information is capable of being detected in the multiple candidate resource set.

Optionally, the determination unit 510 is specifically used for determining at least one resource set, in which the first control information is capable of being detected in the multiple candidate resource sets; and determining the target resource set in the at least one resource set according to a signal receiving quality of the first control information in the at least one resource set.

Optionally, the determination unit 510 is specifically used for determining a resource set corresponding to the first control information with a highest signal receiving quality as the target resource set in the at least one resource set; or determining a resource set corresponding to the first control information of which a signal receiving quality is larger than a preset threshold as the target resource set in the at least one resource set.

Optionally, the first control information is control information transmitted through a Physical Control Format Indicator Channel (PCFICH) or through Downlink Control Information (DCI) in a common search space.

Optionally, the first control information indicates a size of a time-domain resource for transmitting control information in a current time-domain resource unit, or the first control information indicates a size of a time-domain resource for transmitting the second control information in a current time-domain resource unit.

Optionally, the second control information is control information transmitted through Downlink Control Information (DCI) in a common search space or through DCI in a specific search space of the terminal device.

Optionally, the multiple candidate resource sets include at least one of: a physical resource set, a sequence resource set and a control channel resource set.

Optionally, different candidate resource sets in the multiple candidate resource sets occupy different frequency-domain resources and/or different OFDM symbols.

It should be understood that the terminal device 500 may correspond to the terminal device in the method implementations, and may implement corresponding functions of the terminal device. For the sake of brevity, those will not be repeated here.

Figure 6:
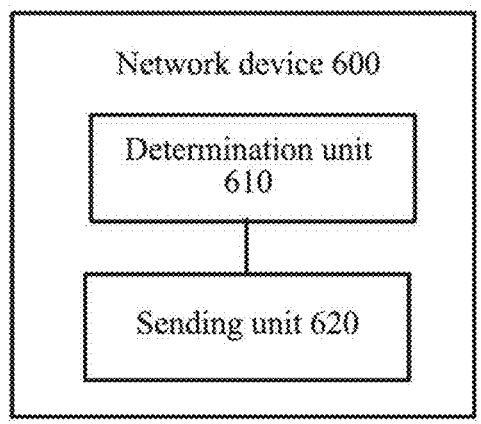
FIG. 6 is a schematic block diagram of a network device according to an implementation of the present application.

FIG. 6 is a schematic block diagram of a network device 600 according to an implementation of the present application. As shown in FIG. 6, the network device 600 includes a determination unit 610 and a sending unit 620.

The determination unit 610 is used for determining multiple candidate resource sets for transmitting first control information.

The sending unit 620 is used for sending the first control information to a terminal device in the multiple candidate resource sets. A beam for sending the first control information on each candidate resource set is different from beams for sending the first control information on other candidate resource sets in the multiple candidate resource sets.

The determination unit 610 is further used for determining multiple control channel resources corresponding to the multiple candidate resource sets.

The sending unit 620 is further used for sending second control information to the terminal device on the multiple control channel resources. A beam for sending the second control information on each control channel resource is the same as a beam for transmitting the first control information on a candidate resource set corresponding to the each control channel resource.

Therefore, the network device uses a same beam to send the first control information and the second control information to the terminal device respectively on the corresponding candidate resource set and control channel resource. Therefore, when the terminal device receives two pieces of control information sent by the network device through the same beam, the terminal device can receive the second control information on the control channel resource corresponding to a resource set for receiving the first control information, such that the terminal device has no need to perform a large amount of blind detection on the multiple control channel resources when receiving the second control information, thereby reducing the complexity of the blind detection for the second control information.

Optionally, the first control information is control information transmitted through a Physical Control Format Indicator Channel (PCFICH) or through Downlink Control Information (DCI) in a common search space.

Optionally, the first control information indicates a size of a time-domain resource for transmitting control information in a current time-domain resource unit, or the first control information indicates a size of a time-domain resource for transmitting the second control information in a current time-domain resource unit.

Optionally, the second control information is control information transmitted through Downlink Control Information (DCI) in a common search space or through DCI in a specific search space of the terminal device.

Optionally, the multiple candidate resource sets include at least one of: a physical resource set, a sequence resource set and a control channel resource set.

Optionally, different candidate resource sets in the multiple candidate resource sets occupy different frequency-domain resources and/or different OFDM symbols.

Figure 7:
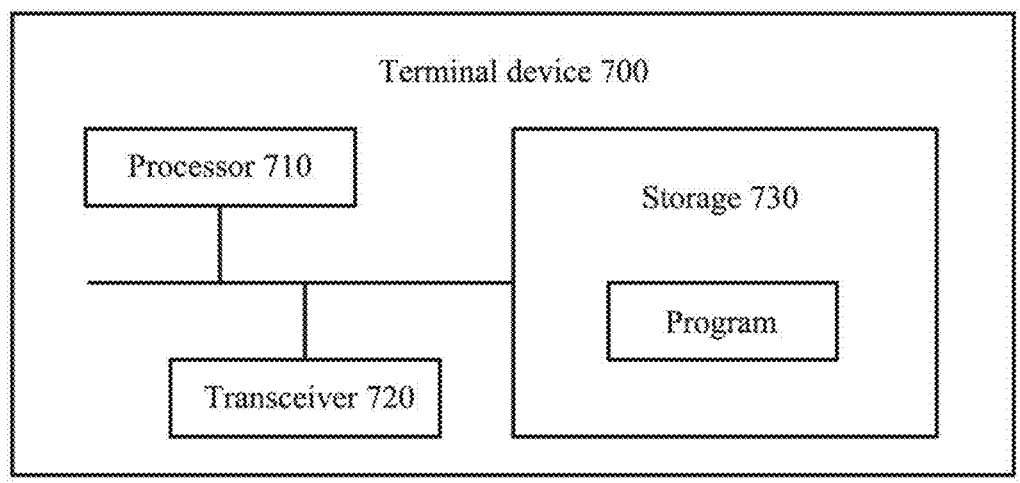
FIG. 7 is a schematic diagram of structure of a terminal device according to an implementation of the present application.

FIG. 7 is a schematic diagram of structure of a terminal device 700 according to an implementation of the present application. As shown in FIG. 7, the terminal device includes a processor 710, a transceiver 720 and a storage 730. The processor 710, the transceiver 720 and the storage 730 communicate with each other through internal connection lines. The storage 730 is used for storing instructions, and the processor 710 is used for executing the instructions stored in the storage 730 to control the transceiver 720 to send and receive signals.

The processor 710 is used for determining multiple candidate resource sets for transmitting first control information.

The transceiver 720 is used for detecting the first control information sent by a network device in the multiple candidate resource sets.

The processor 710 is further used for determining a target resource set in the multiple candidate resource sets according to a detection result of the first control information.

The processor 710 is further used for determining target control channel resource corresponding to the target resource set according to the target resource set and a first mapping relationship. The first mapping relationship is used for indicating a corresponding relationship between the multiple candidate resource sets and multiple control channel resources.

The transceiver 720 is further used for detecting second control information sent by the network device in the target control channel resource.

Therefore, the network device uses the same beam to send the first control information and the second control information to the terminal device respectively on the corresponding candidate resource set and control channel resource. Therefore, when the terminal device receives two pieces of control information sent by the network device through the same beam, the terminal device can receive the second control information on the control channel resource corresponding to a resource set for receiving the first control information, such that the terminal device has no need to perform a large amount of blind detection on the multiple control channel resources when receiving the second control information, thereby reducing the complexity of the blind detection for the second control information.

Optionally, a beam for transmitting the second control information on the target control channel resource is the same as a beam for sending the first control information on the target resource set.

Optionally, the processor 710 is specifically used for determining the target resource set in at least one resource set, in which the first control information is capable of being detected in the multiple candidate resource sets.

Optionally, the processor 710 is specifically used for determining the at least one resource set as the target resource set.

Optionally, the processor 710 is specifically used for determining the target resource set in the at least one resource set according to a signal receiving quality of the first control information.

Optionally, the processor 710 is specifically used for determining a resource set corresponding to the first control information with a highest signal receiving quality as the target resource set in the at least one resource set; or determining a resource set corresponding to the first control information of which a signal receiving quality is larger than or equal to a preset threshold as the target resource set in the at least one resource set.

Optionally, the first control information is control information transmitted through a Physical Control Format Indicator Channel (PCFICH) or through Downlink Control Information (DCI) in a common search space.

Optionally, the first control information indicates a size of a time-domain resource for transmitting control information in a current time-domain resource unit, or the first control information indicates a size of a time-domain resource for transmitting the second control information in a current time-domain resource unit.

Optionally, the second control information is control information transmitted through Downlink Control Information (DCI) in a common search space or through DCI in a specific search space of the terminal device.

Optionally, the multiple candidate resource sets include at least one of: a physical resource set, a sequence resource set and a control channel resource set.

Optionally, different candidate resource sets in the multiple candidate resource sets occupy different frequency-domain resources and/or different OFDM symbols.

It should be understood that, in an implementation of the present application, the processor 710 may be a central processing unit (CPU), or the processor 710 may be other general purpose processor, a digital signal processor (DSP), an application specific integrated circuit (ASIC), a field programmable gate array (FPGA) or other programmable logic device, a discrete gate or a transistor logic device, or a discrete hardware component, etc. The general purpose processor may be a microprocessor, or the processor may be any conventional processor or the like.

The storage 730 may include a read-only memory and a random access memory, and provide instructions and data to the processor 710. A portion of storage 730 may also include a non-volatile random access memory. For example, the storage 730 may also store device-type information.

In an implementation process, the acts of the methods described above may be accomplished by integrated logic circuits of hardware in the processor 710 or instructions in a form of software. The acts of the method for transmitting downlink control information disclosed in combination with implementations of the present application can be directly accomplished by the execution of the hardware processor, or accomplished by the combination of hardware and software modules in the processor 710. The software modules may be located in typical storage medium in the art, such as a random access memory, a flash memory, a read-only memory, a programmable read-only memory or an electrically erasable programmable memory, or register. The storage medium is located in the storage 730, and the processor 710 reads the information in the storage 730 and accomplishes the acts of the above method in combination with its hardware. In order to avoid repetition, it will not be described in detail here.

The terminal device 700 according to the implementations of the present application may correspond to the terminal device in the method 200, which implements the method 200 and may correspond to the terminal device 500 according to the implementations of the present application, and various units or modules in the terminal device 700 are used for implementing various acts or processing processes implemented by the terminal device in the method 200. Here, to avoid repetition, the detailed description thereof is omitted.

Figure 8:
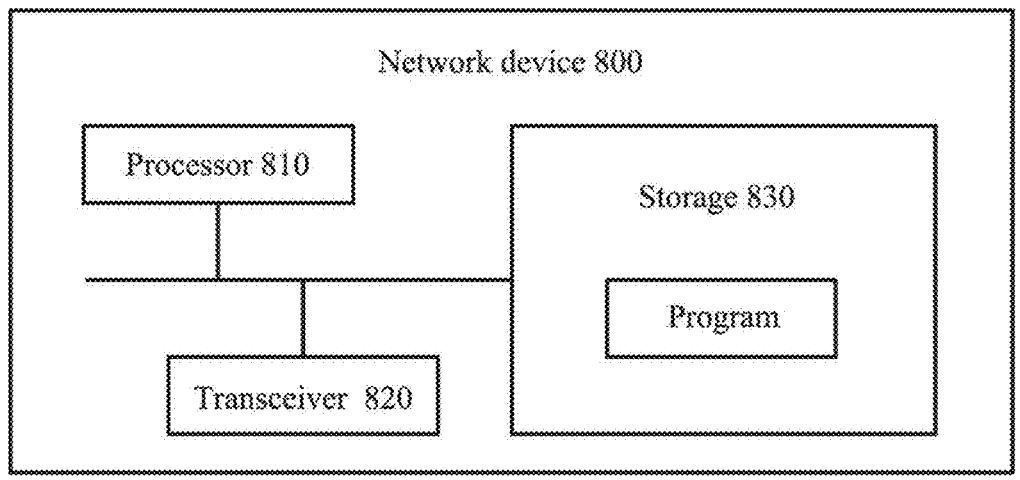
FIG. 8 is a schematic diagram of structure of a network device according to an implementation of the present application.

FIG. 8 is a schematic diagram of structure of a network device 800 according to an implementation of the present application. As shown in FIG. 8, the network device includes a processor 810, a transceiver 820 and a storage 830. The processor 810, the transceiver 820 and the storage 830 communicate with each other through internal connection lines. The storage 830 is used for storing instructions, and the processor 810 is used for executing the instructions stored in the storage 830 to control the transceiver 820 to send and receive signals.

The processor 810 is used for determining multiple candidate resource sets for transmitting first control information.

The transceiver 820 is used for sending the first control information to a terminal device in the multiple candidate resource sets. A beam for sending the first control information on each candidate resource set is different from beams for sending the first control information on other candidate resource sets in the multiple candidate resource sets.

The processor 810 is further used for determining multiple control channel resources corresponding to the multiple candidate resource sets.

The transceiver 820 is further used for sending second control information to the terminal device on the multiple control channel resources. A beam for sending the second control information on each control channel resource is the same as a beam for transmitting the first control information on a candidate resource set corresponding to the each control channel resource.

Therefore, the network device uses the same beam to send the first control information and the second control information to the terminal device respectively on the corresponding candidate resource set and control channel resource. Therefore, when the terminal device receives two pieces of control information sent by the network device through the same beam, the terminal device can receive the second control information on the control channel resource corresponding to a resource set for receiving the first control information, such that the terminal device has no need to perform a large amount of blind detection on the multiple control channel resources when receiving the second control information, thereby reducing the complexity of the blind detection for the second control information.

Optionally, the first control information is control information transmitted through a Physical Control Format Indicator Channel (PCFICH) or through Downlink Control Information (DCI) in a common search space.

Optionally, the first control information indicates a size of a time-domain resource for transmitting control information in a current time-domain resource unit, or the first control information indicates a size of a time-domain resource for transmitting the second control information in a current time-domain resource unit.

Optionally, the second control information is control information transmitted through Downlink Control Information (DCI) in a common search space or through DCI in a specific search space of the terminal device.

Optionally, the multiple candidate resource sets include at least one of: a physical resource set, a sequence resource set and a control channel resource set.

Optionally, different candidate resource sets in the multiple candidate resource sets occupy different frequency-domain resources and/or different OFDM symbols.

It should be understood that, in an implementation of the present application, the processor 810 may be a central processing unit (CPU), or the processor 810 may be other general purpose processor, a digital signal processor (DSP), an application specific integrated circuit (ASIC), a field programmable gate array (FPGA) or other programmable logic device, a discrete gate or a transistor logic device, or a discrete hardware component, etc. The general purpose processor may be a microprocessor, or the processor may be any conventional processor or the like.

The storage 830 may include a read-only memory and a random access memory and provide instructions and data to the processor 810. A portion of storage 830 may also include a non-volatile random access memory. For example, the storage 830 may also store device-type information.

In an implementation process, the acts of the methods described above may be accomplished by integrated logic circuits of hardware in the processor 810 or instructions in a form of software. The acts of the method for transmitting downlink control information disclosed in combination with implementations of the present application can be directly accomplished by the execution of the hardware processor, or accomplished by the combination of hardware and software modules in the processor 810. The software modules may be located in typical storage medium in the art, such as a random access memory, a flash memory, a read-only memory, a programmable read-only memory or an electrically erasable programmable memory, or a register. The storage medium is located in the storage 830, and the processor 810 reads the information in the storage 830 and accomplishes the acts of the above method in combination with its hardware. To avoid repetition, the detail will not be described here.

The network device 800 according to the implementations of the present application may correspond to the network device in the method 400, which implements the method 400 and may correspond to the network device 600 according to the implementations of the present application, and various units or modules in the network device 800 are used for implementing various acts or processing processes implemented by the network device in the method 400. Here, to avoid repetition, the detailed description thereof is omitted.

Figure 9:
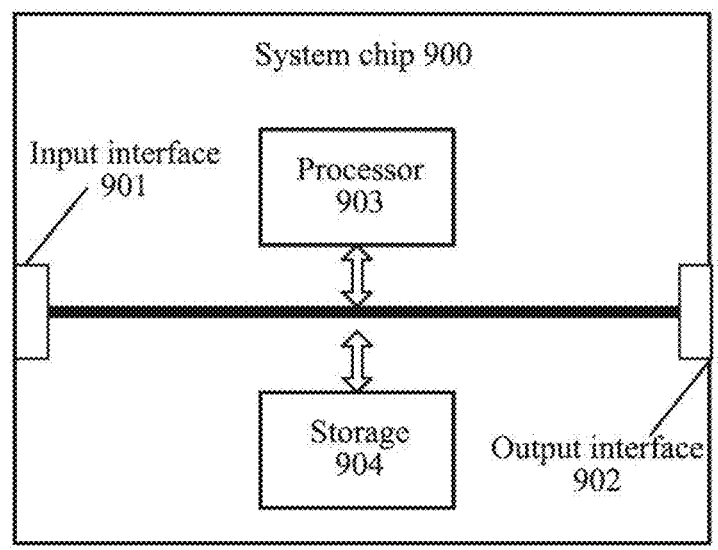
FIG. 9 is a schematic diagram of structure of a system chip according to an implementation of the present application.

FIG. 9 is a schematic diagram of structure of a system chip according to an implementation of the present application. The system chip 900 in FIG. 9 includes an input interface 901, an output interface 902, at least one processor 903, a storage 904. The input interface 901, the output interface 902, the at least one processor 903 and the storage 904 are connected each other via internal connection lines. The processor 903 is used for executing codes in the storage 904.

Optionally, when the code is executed, the processor 903 may implement the method implemented by the terminal device in the method implementations. For the sake of brevity, it will not be repeated here.

Optionally, when the code is executed, the processor 903 may implement the method implemented by the network device in the method implementations. For the sake of brevity, it will not be repeated here.

It should be understood that in various implementations of the present application, values of sequence numbers in the aforementioned processes do not indicate an order of execution, and the order of execution of various processes should be determined by their functions and internal logics, and should not constitute any limitation on implementation processes of implementations of the present application.

Those of ordinary skill in the art will recognize that the exemplary units and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art can clearly understand that for convenience and conciseness of description, the specific working processes of the system, device and unit described above may refer to the corresponding processes in the aforementioned method implementations and will not be described here.

In several implementations provided by the present application, it should be understood that the disclosed systems, devices and methods may be implemented in other ways. For example, the device implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The units described as separate units may or may not be physically separated, and the unit shown as a unit may or may not be a physical unit, i.e., may be located in one place or may be distributed over multiple network units. Some or all of the elements can be selected according to actual needs to achieve the purpose of the implementations.

In addition, various functional units in various implementations of the present application may be integrated in one processing unit, or the various units may be physically present separately, or two or more units may be integrated in one unit.

The function units may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a variety of instructions for causing a computer device (which may be a personal computer, a server, or a network device) to perform all or part of the acts of the method described in various implementations of the present application. The aforementioned storage medium include a U disk, a mobile hard disk, a read-only memory (ROM), a random access memory (RAM), a magnetic disk or an optical disk and other media that can store program codes.

What are described above are merely specific implementations of the present application, but the protection scope of implementations of the present application is not limited thereto. Any change or substation that can be easily conceived by a person skilled in the art within the technical scope disclosed by the implementations of the present application shall be included within the protection scope suitable for private rights of the present application. Therefore, the protection scope of the implementations of the present application shall be the protection scope defined by the claims.

What is claimed is:

1. A method for transmitting downlink control information, comprising:
   determining, by a terminal device, a plurality of candidate resource sets for transmitting first control information, wherein the plurality of candidate resource sets comprises a control channel resource set, and different candidate resource sets in the plurality of candidate resource sets occupy different Orthogonal Frequency Division multiplexing (OFDM) symbols;
   detecting, by the terminal device, the first control information sent by a network device in the plurality of candidate resource sets;
   determining, by the terminal device, a target resource set from the plurality of candidate resource sets according to a detection result of the first control information;
   determining, by the terminal device, a target control channel resource corresponding to the target resource set according to the target resource set and a first mapping relationship, wherein the first mapping relationship is used for indicating a corresponding relationship between the plurality of candidate resource sets and a plurality of control channel resources; and
   detecting, by the terminal device, second control information sent by the network device in the target control channel resource.

2. The method according to claim 1, wherein a beam for transmitting the second control information on the target control channel resource is the same as a beam for sending the first control information on the target resource set.

3. The method according to claim 1, wherein determining, by the terminal device, the target resource set from the plurality of candidate resource sets according to the detection result of the first control information comprises:
   determining, by the terminal device, the target resource set from at least one resource set, in which the first control information is capable of being detected, in the plurality of candidate resource sets.

4. The method according to claim 3, wherein determining, by the terminal device, the target resource set from the at least one resource set, in which the first control information is capable of being detected, in the plurality of candidate resource sets comprises:
   determining, by the terminal device, the at least one resource set as the target resource set; or
   determining, by the terminal device, the target resource set from the at least one resource set according to a signal receiving quality of the first control information.

5. The method according to claim 4, wherein determining, by the terminal device, the target resource set from the at least one resource set according to the signal receiving quality of the first control information comprises:
   determining, by the terminal device, a resource set corresponding to the first control information with a highest signal receiving quality from the at least one resource set as the target resource set; or
   determining, by the terminal device, a resource set corresponding to the first control information of which a signal receiving quality is larger than or equal to a preset threshold from the at least one resource set as the target resource set.

6. The method according to claim 1, wherein the first control information is control information transmitted through a Physical Control Format Indicator Channel (PCFICH), or through Downlink Control Information (DCI) in a common search space.

7. The method according to claim 1, wherein the first control information indicates a size of a time-domain resource for transmitting control information in a current time-domain resource unit, or the first control information indicates a size of a time-domain resource for transmitting the second control information in a current time-domain resource unit.

8. A terminal device, comprising:
   a processor, used for determining a plurality of candidate resource sets for transmitting first control information, wherein the plurality of candidate resource sets comprises a control channel resource set, and different candidate resource sets in the plurality of candidate resource sets occupy different Orthogonal Frequency Division multiplexing (OFDM) symbols; and
   a transceiver, used for detecting the first control information sent by a network device in the plurality of candidate resource sets;
   wherein the processor is further used for determining a target resource set from the plurality of candidate resource sets according to a detection result of the first control information;
   the processor is further used for determining a target control channel resource corresponding to the target resource set according to the target resource set and a first mapping relationship, wherein the first mapping relationship is used for indicating a corresponding relationship between the plurality of candidate resource sets and a plurality of control channel resources; and
   the transceiver is further used for detecting second control information sent by the network device in the target control channel resource.

9. The terminal device according to claim 8, wherein a beam for transmitting the second control information on the target control channel resource is the same as a beam for sending the first control information on the target resource set.

10. The terminal device according to claim 8, wherein the processor is specifically used for:

determining the target resource set from at least one resource set, in which the first control information is capable of being detected, in the plurality of candidate resource sets.

11. The terminal device according to claim 10, wherein the processor is specifically used for:
   determining the at least one resource set as the target resource set; or
   determining the target resource set from the at least one resource set according to a signal receiving quality of the first control information.

12. The terminal device according to claim 11, wherein the processor is specifically used for:
   determining a resource set corresponding to the first control information with a highest signal receiving quality from the at least one resource set as the target resource set; or
   determining a resource set corresponding to the first control information of which a signal receiving quality is larger than or equal to a preset threshold from the at least one resource set as the target resource set.

13. The terminal device according to claim 8, wherein the first control information is control information transmitted through a Physical Control Format Indicator Channel (PCFICH), or through Downlink Control Information (DCI) in a common search space.

14. The terminal device according to claim 8, wherein the first control information indicates a size of a time-domain resource for transmitting control information in a current time-domain resource unit, or the first control information indicates a size of a time-domain resource for transmitting the second control information in a current time-domain resource unit.

15. A network device, comprising:
a processor, used for determining a plurality of candidate resource sets for transmitting first control information, wherein the plurality of candidate resource sets comprises a control channel resource set, and different candidate resource sets in the plurality of candidate resource sets occupy different Orthogonal Frequency Division multiplexing (OFDM) symbols; and
a transceiver, used for sending the first control information to a terminal device in the plurality of candidate resource sets, wherein, a beam for sending the first control information on each candidate resource set is different from beams for sending the first control information on other candidate resource sets in the plurality of candidate resource sets;
wherein the processor is further used for determining a plurality of control channel resources corresponding to the plurality of candidate resource sets; and
the transceiver is further used for sending second control information to the terminal device on the plurality of control channel resources, wherein, a beam for sending the second control information on each control channel resource is the same as a beam for transmitting the first control information on a candidate resource set corresponding to the each control channel resource.

16. The network device according to claim 15, wherein the first control information indicates a size of a time-domain resource for transmitting control information in a current time-domain resource unit, or the first control information indicates a size of a time-domain resource for transmitting the second control information in a current time-domain resource unit.

* * * * *